(12) United States Patent
Kim et al.

(10) Patent No.: US 7,551,353 B2
(45) Date of Patent: Jun. 23, 2009

(54) GLASSLESS STEREOSCOPIC DISPLAY

(75) Inventors: Tae-hee Kim, Suwon-si (KR); Sergey Shestak, Suwon-si (KR); Dae-sik Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 262 days.

(21) Appl. No.: 11/377,688

(22) Filed: Mar. 17, 2006

(65) Prior Publication Data

US 2007/0024968 A1 Feb. 1, 2007

(30) Foreign Application Priority Data

Jul. 27, 2005 (KR) .................... 10-2005-0068613

(51) Int. Cl.
*G02B 27/22* (2006.01)
(52) U.S. Cl. ............................ 359/462; 359/463
(58) Field of Classification Search .............. None
See application file for complete search history.

(56) References Cited

U.S. PATENT DOCUMENTS

| | | | | |
|---|---|---|---|---|
| 4,180,313 A | * | 12/1979 | Inuiya | 396/330 |
| 5,852,512 A | * | 12/1998 | Chikazawa | 359/463 |
| 5,896,225 A | * | 4/1999 | Chikazawa | 359/463 |
| 6,097,554 A | * | 8/2000 | Watkins | 359/833 |
| 6,700,701 B1 | * | 3/2004 | Son et al. | 359/443 |
| 6,791,570 B1 | | 9/2004 | Schwerdtner et al. | |
| 2004/0174604 A1 | * | 9/2004 | Brown | 359/618 |
| 2005/0111100 A1 | * | 5/2005 | Mather et al. | 359/464 |

FOREIGN PATENT DOCUMENTS

| | | |
|---|---|---|
| JP | 9-9297 A | 1/1997 |
| JP | 2003-029205 | 1/2003 |
| JP | 2004-239932 A | 8/2004 |
| KR | 10-0400221 B1 | 9/2003 |

* cited by examiner

*Primary Examiner*—Lee Fineman
(74) *Attorney, Agent, or Firm*—Sughrue Mion, PLLC

(57) ABSTRACT

A glassless stereoscopic display, which does not produce color separation and black stripes, includes: a display panel displaying an image using a plurality of pixels; a 3D optical plate separating the image displayed by the display panel into a left-eye image and a right-eye image; and a prism sheet disposed between the display panel and the 3D optical plate and having a plurality of prism elements regularly arranged to rotate an image provided by each of the pixels of the display panel by approximately 90°.

15 Claims, 8 Drawing Sheets

VIEWING DISTANCE

INTENSITY

LEFT EYE    RIGHT EYE

GLASSLESS STEREOSCOPIC DISPLAY

CROSS-REFERENCE TO RELATED PATENT APPLICATION

This application claims priority from Korean Patent Application No. 10-2005-0068613 filed on Jul. 27, 2005, in the Korean Intellectual Property Office, the disclosure of which is incorporated herein in its entirety by reference.

BACKGROUND OF THE INVENTION

1. Field of the Invention

The present invention relates to a glassless stereoscopic display and, more particularly, to a glassless stereoscopic display that does not cause color separation and black stripes.

2. Description of the Related Art

In general, stereoscopic displays provide a stereoscopic image based on binocular parallax by separating an original image into a left-eye image and a right-eye image and providing the separated left-eye image and right-eye image to a viewer's left and right eyes, respectively. Stereoscopic displays are roughly divided into displays using glasses and glassless displays. Displays using glasses have a disadvantage in that a user must wear special viewing aids such as polarization glasses. To solve this problem, glassless displays have been developed, which separate an original image into a left-eye image and a right-eye image using a three-dimensional (3D) optical plate, such as a parallax barrier or a lenticular lens sheet, disposed in front of a display panel. Accordingly, a viewer can see a 3D image without special viewing aids. However, such conventional 3D displays using a parallax barrier or lenticular lens sheet suffer from color separation and black stripes.

FIG. 1 is a schematic view illustrating why color separation occurs in a conventional glassless stereoscopic display. Referring to FIG. 1, the conventional glassless stereoscopic display includes a display panel 10 displaying an image, and a 3D optical plate 15 separating the image displayed by the display panel 10 into a left-eye image and a right-eye image. The display panel 10 includes a plurality of pixels 11, each composed of red (R), green (G), and blue (B) colored sub pixels. The pixels 11 display left-eye images L1 and L2 and right-eye images R1 and R2 in an alternating pattern. The left-eye images L1 and L2 and the right-eye images R1 and R2 displayed by the pixels 11 are enlarged by the 3D optical plate 15, such as a lenticlar lens sheet, to be respectively focused on a viewer's left eye and right eye within a viewing distance. Since the RGB sub pixels arranged in an X-direction are also enlarged and focused at the viewing distance, when the viewer moves his head in the X-direction, colors in the image are separated into red (R), green (G), and blue (B) components. Accordingly, the red (R) looks stronger when the viewer is in a position "A", the green (G) looks stronger when the viewer is in a position "B", and the blue (B) looks stronger when the viewer is in a position "C". Such a phenomenon is referred to as color separation, and hinders the viewer from seeing a natural 3D image. Although the 3D optical plate 15 shown in FIG. 1 is a lenticular lens sheet, a parallax barrier can produce the same effect.

FIGS. 2A and 2B are schematic views illustrating why black stripes occur in the conventional glassless stereoscopic display of FIG. 1. Referring to FIG. 2A, a black matrix is typically formed between the RGB sub pixels of the display panel 10. When the left-eye images L1 and L2 and the right-eye images R1 and R2 displayed by the display panel 10 are enlarged by the 3D optical plate 15 to be focused on the viewer's left eye and right eye within the viewing distance, the black matrix is also enlarged and focused in the viewing distance. Referring to FIG. 2B, portions where light intensity drastically decreases are periodically produced in the X-direction. Accordingly, when the viewer moves his head in the X-direction, he perceives black stripes 20 as well as color separation. The black stripes 20 also hinder the viewer from watching a natural 3D image.

SUMMARY OF THE INVENTION

The present invention provides a glassless stereoscopic display which enables a viewer to see a natural 3D image without color separation and black stripes.

According to an aspect of the present invention, there is provided a stereoscopic display comprising: a display panel displaying an image using a plurality of pixels; a three-dimensional (3D) optical plate separating the image displayed by the display panel into a left-eye image and a right-eye image; and a prism sheet disposed between the display panel and the 3D optical plate and having a plurality of prism elements regularly arranged to rotate an image provided by each of the pixels of the display panel by approximately 90°.

Each of the plurality of prism elements may have a first inclined surface on which an image is incident and a second inclined surface through which an image emerges, and an angle of intersection between extensions of the first inclined surface and the second inclined surface may be approximately 90°.

The prism elements may be dove prisms.

The prism elements of the prism sheet may be diagonally slanted with respect to the pixels of the display panel. The plurality of prism elements may be slanted by approximately 45°.

Each of the prism elements of the prism sheet may respectively correspond to a series of pixels which are diagonally connected in the display panel.

The width of a horizontal section of each of the prism elements may be equal to the width of each of the pixels of the display panel.

The stereoscopic display may further comprise a plurality of black masks regularly formed in each of the prism elements to block images displayed by edge portions of the pixels of the display panel, thereby preventing crosstalk between adjacent pixels.

Regions of the prism elements where the black masks are not formed may rotate images displayed by the pixels by 90° such that red, green and blue (RGB) sub pixels which are arranged horizontally appear to be arranged vertically.

The prism sheet may comprise: an entrance prism sheet having a plurality of regular inclined surfaces on which images provided by the display panel are incident; an exit prism sheet having a plurality of regular inclined surfaces through which the images incident on the entrance prism sheet emerge; and a black mask film that is interposed between the entrance prism sheet and the exit prism sheet and includes a plurality of black masks which are regularly formed in a grating pattern to block images displayed by the edge portions of the pixels of the display panel.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

The present invention will now be described more fully with reference to the accompanying drawings, in which illustrative, non-limiting embodiments of the invention are shown.

Figure 1:
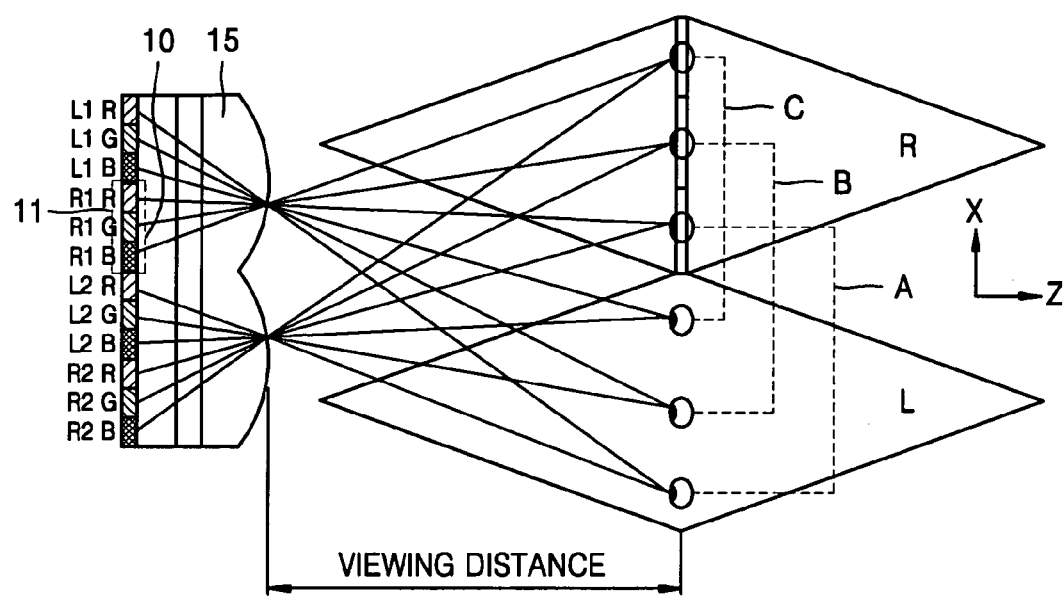
FIG. 1 is a schematic view illustrating why color separation occurs in a conventional glassless stereoscopic display.
Figure 2A:
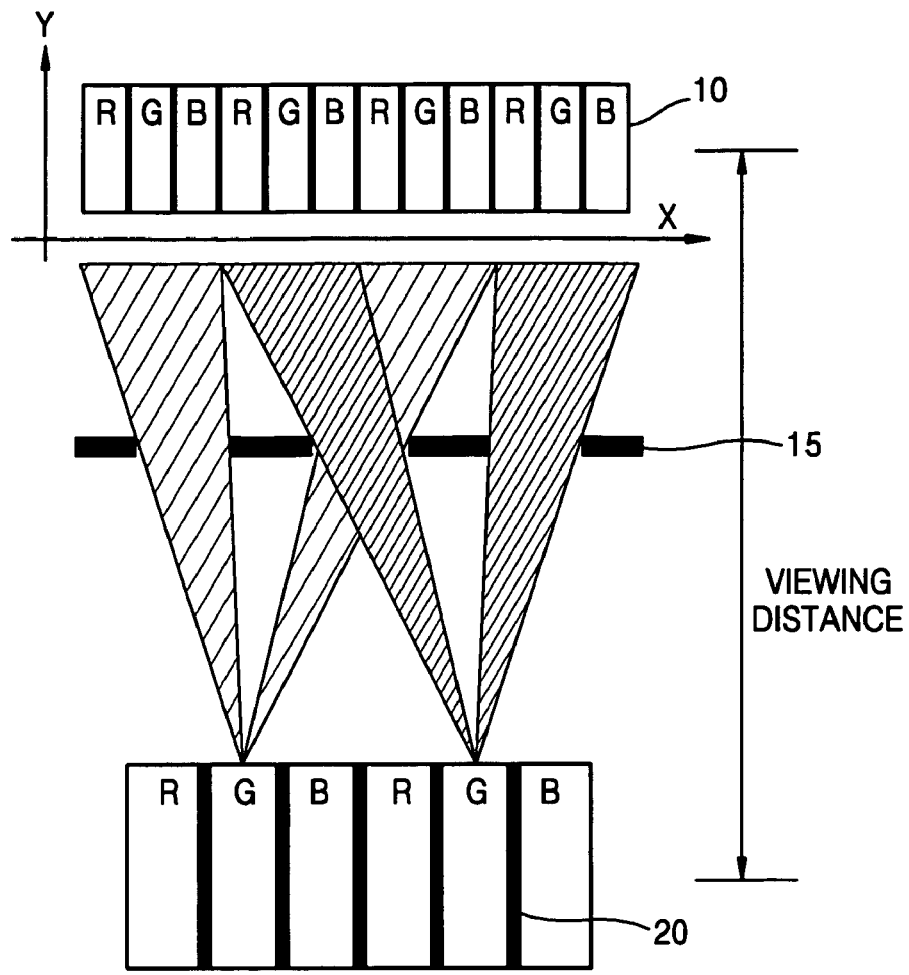
FIGS. 2A and 2B are schematic views illustrating why black stripes occur in the conventional glassless stereoscopic display of FIG. 1.
Figure 2B:
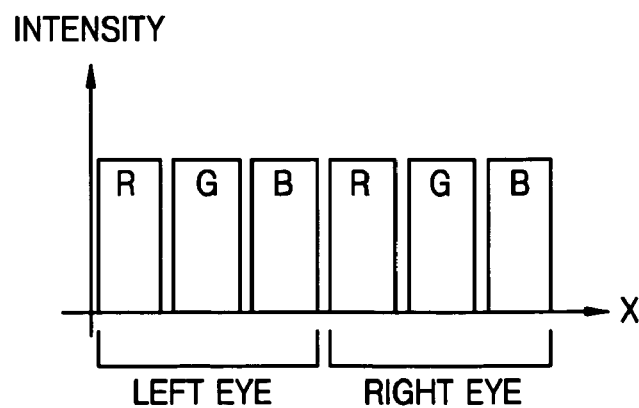
Figure 3:
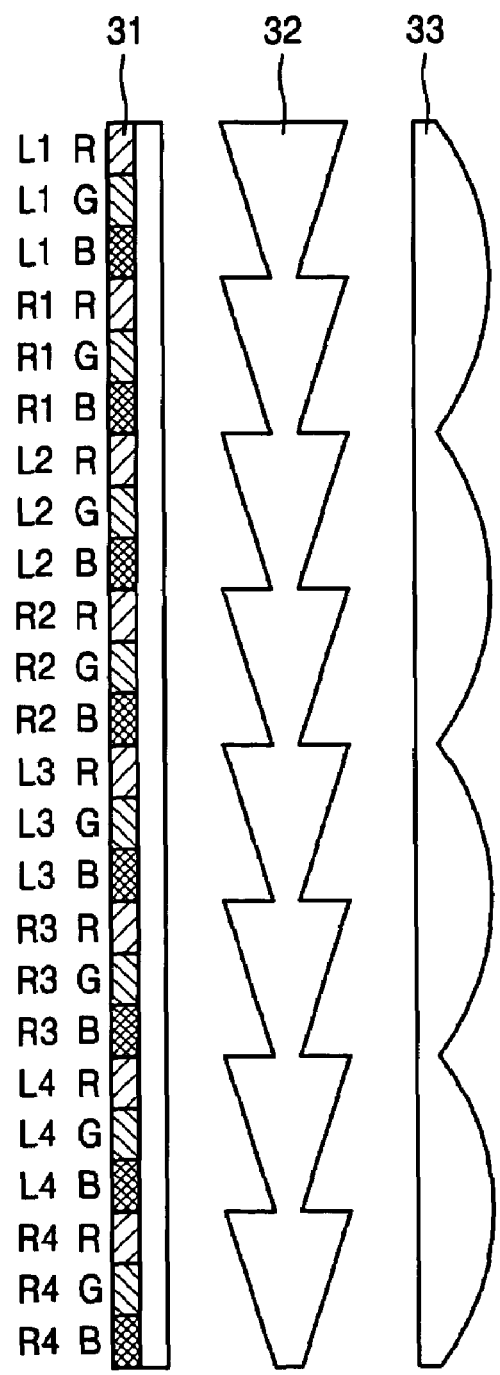
FIG. 3 is a sectional view of a glassless stereoscopic display according to an exemplary embodiment of the present invention.

FIG. 3 is a sectional view of a glassless stereoscopic display 30 according to an exemplary embodiment of the present invention. Referring to FIG. 3, the glassless stereoscopic display 30 includes a display panel 31 displaying an image, a three-dimensional (3D) optical plate 33 separating the image displayed by the display panel 31 into a left-eye image and a right-eye image, and a prism sheet 32 disposed between the display panel 31 and the 3D optical plate 33 to rotate the image displayed by the display panel 31 by about 90°.

As is well known, the display panel 31 displays an image using a plurality of pixels that are arranged in two dimensions. As shown in FIG. 3, each of the pixels of the display panel 31 includes three sub pixels producing red (R), green (G), and blue (B) colors, which are arranged sequentially in a horizontal direction. The pixels of the display panel 31 display left-eye images L1 through L4 and right-eye images R1 through R4 in an alternating pattern. The display panel 31 can be any one of a cathode ray tube (CRT) display panel, a liquid crystal display (LCD) panel, a plasma display panel (PDP), an organic light emitting diode (OLED), and a field emission display (FED) panel, each of which comprises a plurality of pixels.

The 3D optical plate 33 is a well-known optical element that forms the left images L1 through L4 in a viewer's left eye and the right-eye images R1 through R4 in the viewer's right eye. The 3D optical plate 33 may be a lenticular lens sheet or a parallax barrier.

According to the present exemplary embodiment, the prism sheet 32 includes a plurality of prism elements which are regularly arranged to rotate images provided by the pixels of the display panel 31 by about 90°. As shown in FIG. 3, one of the prism elements of the prism sheet 32 corresponds to one of the pixels of the display panel, and rotates an image provided by one pixel by about 90°. The image rotated by about 90° is focused on the viewer's left eye or right eye by the 3D optical plate 33. In this case, RGB sub pixels constituting each of pixels appear to be arranged vertically, not horizontally. Accordingly, even if the viewer moves his head horizontally, he does not perceive color separation or black stripes.

Figure 4A:
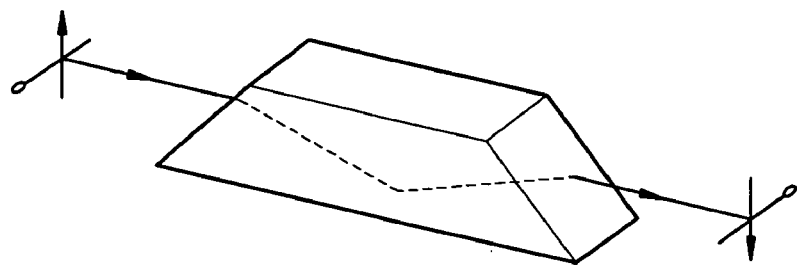
FIGS. 4A through 4C are schematic views for explaining the principle of rotating an image using a rectangular prism.
Figure 4B:
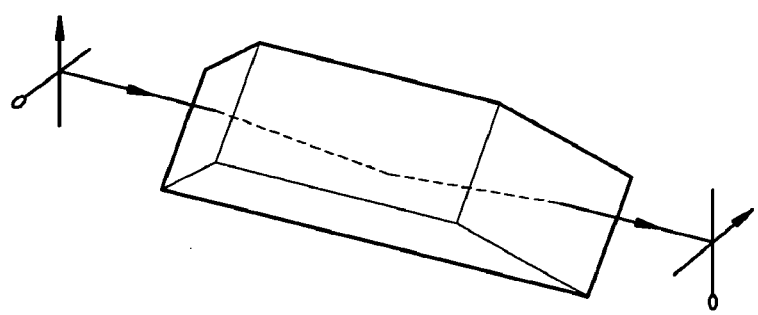
Figure 4C:
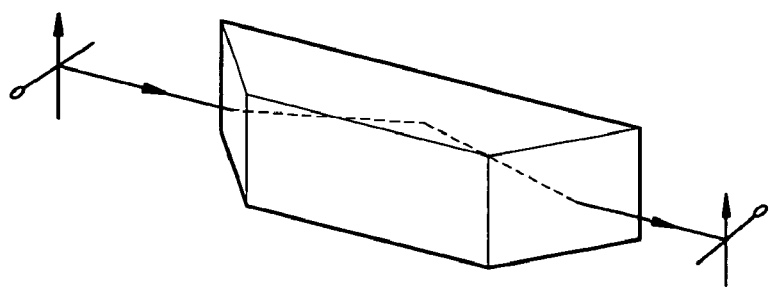

FIGS. 4A through 4C are schematic views for explaining the principle of rotating an image using a rectangular prism. In an exemplary embodiment of the present invention, a rectangular prism has an isosceles-triangular section with one interior angle of 90° and two interior angles of 45°. Since rectangular prisms totally reflect incident light, they are often used to change the propagation direction of light. Also, it is known that when an image incident on an inclined surface of a rectangular prism is totally reflected by a bottom surface of the rectangular prism and then emerges through the other inclined surface of the rectangular prism, the image is rotated.

Referring to FIG. 4A, when a rotation angle of a rectangular prism is 0°, an image incident on an incident inclined surface of the rectangular prism and an image emerged through an exit inclined surface of the rectangular prism are the same horizontally but reversed vertically. Referring to FIG. 4B, when a rotation angle of the rectangular prism is 45°, the image which emerges through the exit inclined surface of the rectangular prism is rotated by 90° from the original image. Referring to FIG. 4C, when a rotation angle of the rectangular prism is 90°, the original image and the resultant image are the same vertically, but reversed horizontally. In those cases, since the vertex of the rectangular prism is not used, it can be removed to reduce the size and manufacturing costs. The rectangular prism whose vertex is removed as shown in FIGS. 4A through 4C is referred to as a dove prism.

If a rectangular prism, that is, the dove prism has a rotation angle of 45° and is disposed in front of each of the pixels of the display panel 31, the rectangular prism can rotate an image displayed by each of the pixels of the display panel 31 by 90°. A rectangular prism, i.e., a dove prism, may be disposed in front of each of the pixels of the display panel 31, or a prism sheet 32 including a plurality of dove prisms which are arranged in a regular pattern can be disposed in front of the display panel 31 as shown in FIG. 3.

Figure 5:
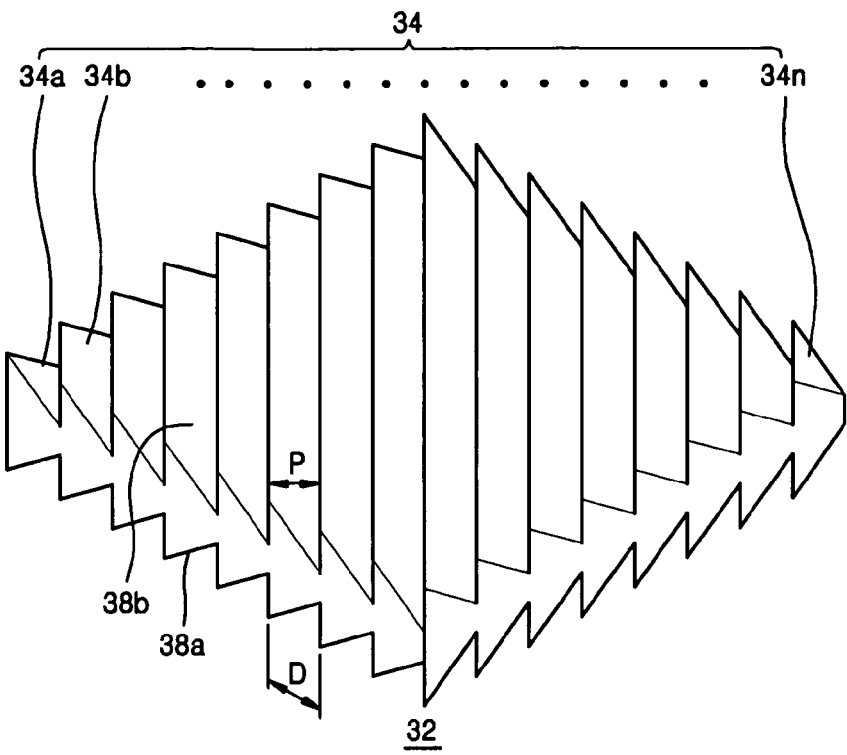
FIG. 5 is a perspective view of a prism sheet used in the glassless stereoscopic display of FIG. 3 to rotate an image.

FIG. 5 is a perspective view of a prism sheet 32 according to an exemplary embodiment of the present invention. Referring to FIG. 5, the prism sheet 32 is a prism array 34 in which a plurality of dove prism elements 34a through 34n are regularly arranged. Each of the dove prism elements 34a through 34n includes an incident inclined surface 38a on which an image is incident and an exit inclined surface 38b through which an image is emerged. An angle of intersection between extensions of the incident inclined surface 38a and the exit inclined surface 38b is 90°. Also, as shown in FIG. 5, the prism array 34 of the prism sheet 32 is slanted by a predetermined angle so that each of the prism elements 34a through 34n can rotate an image displayed by each of the pixels of the display panel 31. For example, the prism elements 34a through 34n may be slanted approximately 45° with respect to a horizontal surface of the display panel 31 as shown in FIG. 4B.

When the prism sheet 32 with the slanted dove prism elements 34a through 34n, which are arranged in parallel, is disposed in front of the display panel 31, the prism elements 34a through 34n of the prism sheet 32 are diagonally slanted with respect to the pixels of the display panel 31. That is, one of the prism elements of the prism sheet 32 corresponds to a series of pixels which are diagonally connected in the display panel 31. Accordingly, one of the prism elements of the prism sheet 32 can simultaneously rotate a plurality of images displayed by the pixels which are diagonally connected in the display panel 31. To this end, the width D of a horizontal cross section of one slanted prism element may be equal to the width of one of the pixels of the display panel 31 as shown in FIG. 3. For example, when the width of each of the pixels of the display panel 31 is 264 μm, the width of a horizontal cross section of each of the prism elements is also 264 μm. In this case, each of the prism elements of the prism sheet 32 has a pitch P of approximately 186 μm.

Figure 6:
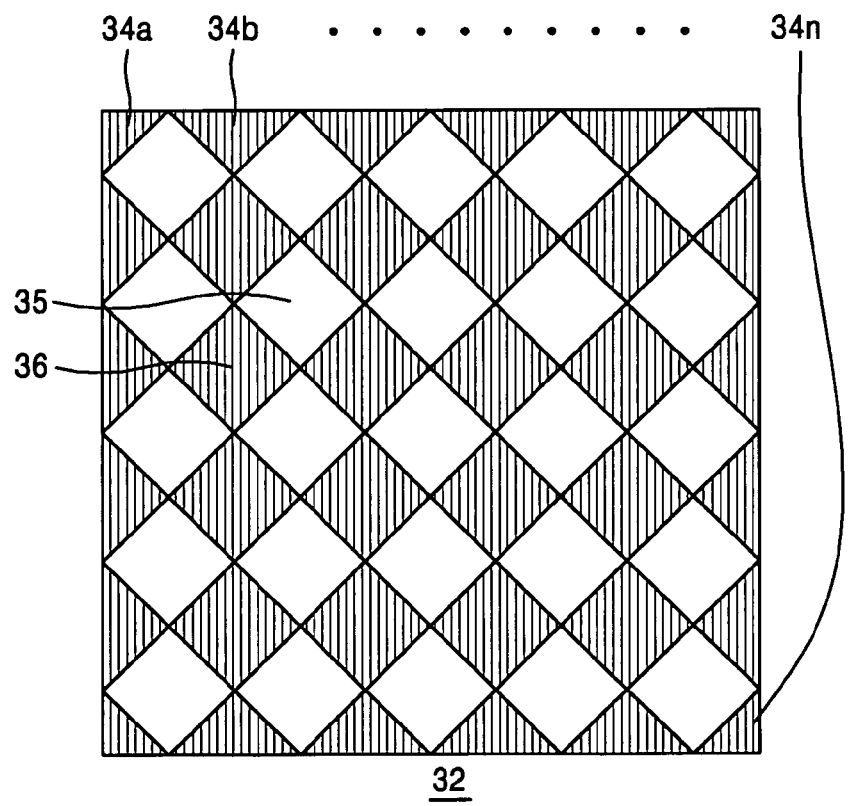
FIG. 6 is a plan view of the prism sheet of FIG. 5 in which black masks are formed according to an exemplary embodiment of the present invention.

Since the pixels of the display panel 31 are square or rectangular and are arranged vertically and horizontally, a series of diagonally connected pixels and edges of pixels adjacent to the diagonally connected pixels overlap by the area of one of the slanted prism elements. In this case, since images displayed by the series of diagonally connected pixels and part of images displayed by the pixels adjacent to the diagonally connected pixels are rotated by the one prism element, crosstalk may occur. To avoid crosstalk, a plurality of black masks for blocking images displayed by edges of the pixels of the display panel 31 may be regularly arranged in the prism elements. FIG. 6 is a plan view of the prism sheet 32 including such black masks according to an exemplary embodiment of the present invention. Referring to FIG. 6, a plurality of black masks 36 are regularly arranged in a grating pattern in each of the prism elements 34a through 34n of the prism sheet 32. Since the black masks 36 block images displayed by border portions of adjacent pixels, an image displayed by only one pixel can be transmitted through regions 35 of the prism sheet 32 where the black masks 36 are not formed. Accordingly, crosstalk resulting from mixed images of adjacent pixels can be avoided.

Figure 7:
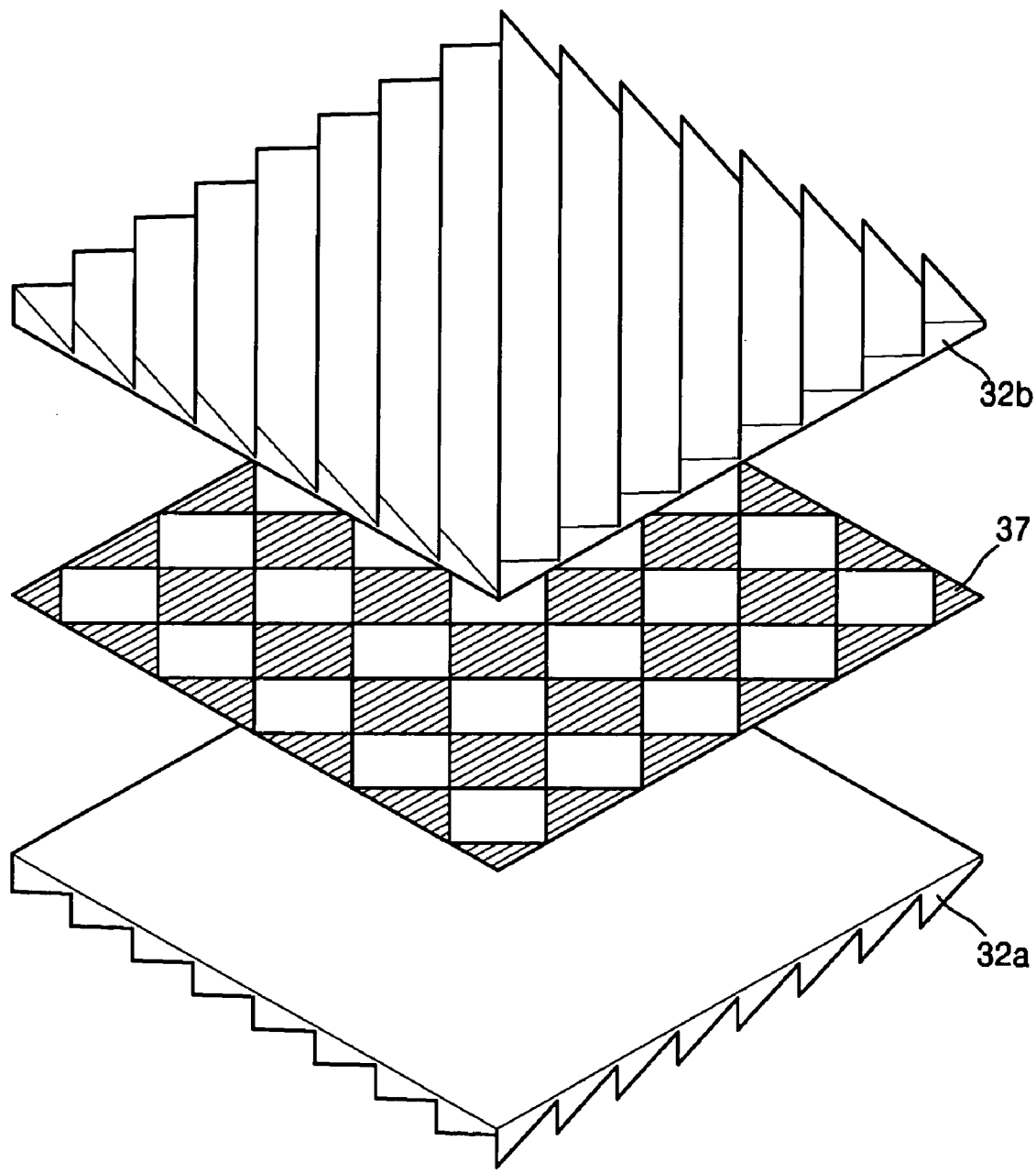
FIG. 7 is an exploded perspective view of a prism sheet in which a black mask film is formed according to an exemplary embodiment of the present invention.

After the prism sheet 32 shown in FIG. 5 is formed, the black masks 36 may be formed on the surface of the prism sheet 32. For convenience though, a black mask film in which the black masks 36 are formed may be inserted into the prism sheet 32 while the prism sheet 32 is manufactured. FIG. 7 is an exploded perspective view of the prism sheet 32 in which the black mask film is formed. Referring to FIG. 7, an entrance prism sheet 32a having a plurality of regular inclined surfaces on which images are incident and an exit prism sheet 32b having a plurality of regular inclined surfaces through which the images incident on the entrance prism sheet 32a are emerged are manufactured separately. Thereafter, a black mask film 37 in which the plurality of black masks 36 are regularly arranged in a grating pattern is disposed between the entrance prism sheet 32a and the exit prism sheet 32b. Next, the entrance prism sheet 32 and the exit prism sheet 32b are attached to each other, thereby completing the prism sheet 32 according to the present embodiment.

Figure 8A:
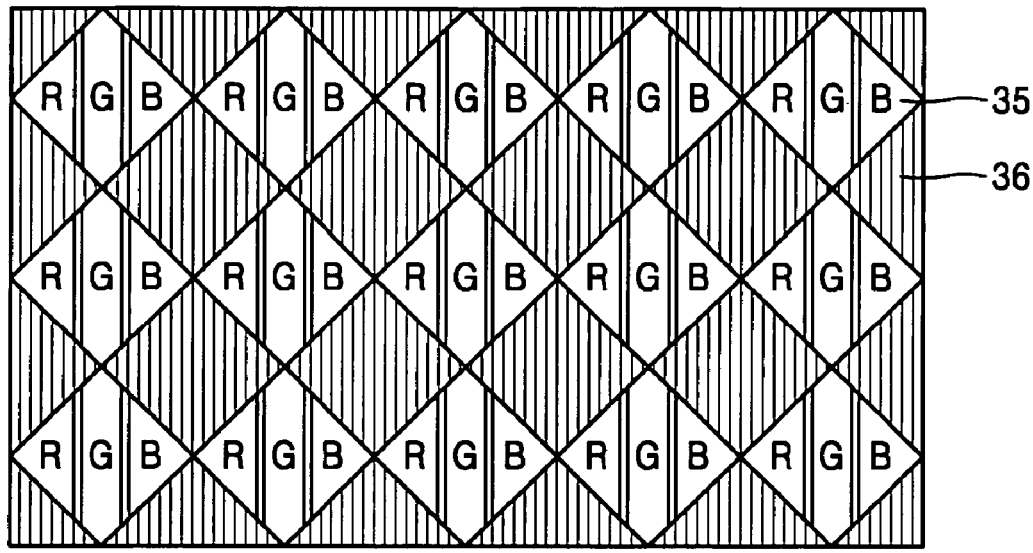
FIGS. 8A and 8B are schematic views for explaining the operating principle of the glassless stereoscopic display of FIG. 3.
Figure 8B:
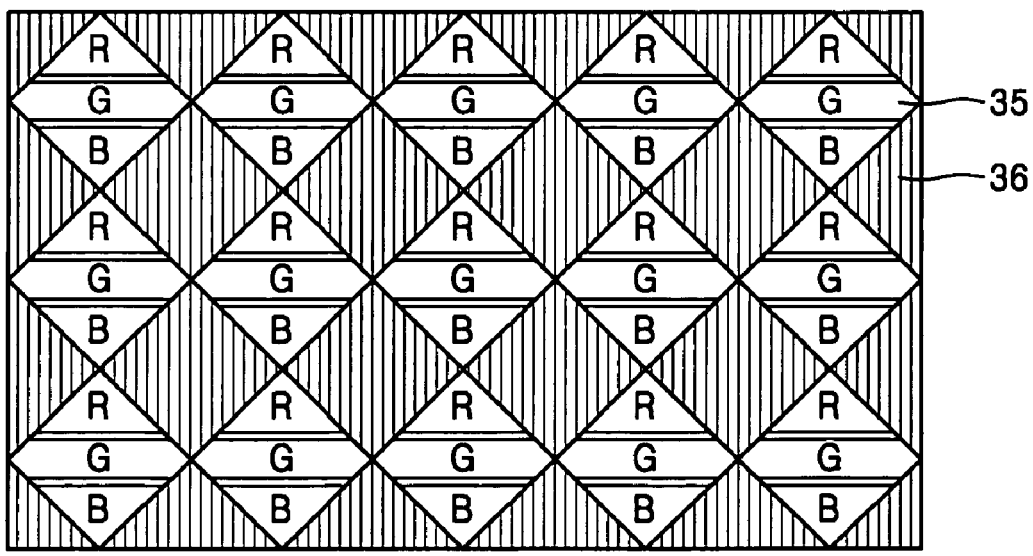

The operating principle of the glassless stereoscopic display of FIG. 3 will be explained in detail with reference to FIGS. 8A and 8B. FIG. 8A illustrates images passing through the prism sheet 32 overlapping the display panel 31 before the images are rotated. Referring to FIG. 8A, each of the prism elements of the prism sheet 32 corresponds to a series of pixels which are diagonally connected in the display panel 31. RGB sub pixels are horizontally arranged in each of the pixels. Also, the black masks 36 of the prism sheet 32 precisely cover edges of the pixels of the display panel 31. Accordingly, only one pixel can be seen through the regions 35 of the prism sheet 32 where the black masks 36 are not formed.

In this arrangement, images displayed by the pixels of the display panel 31 are rotated by approximately 90° due to the prism sheet 32 based on the principle explained with reference to FIG. 4B. Accordingly, referring to FIG. 8B, the images passing through the prism sheet 32 are formed such that the RGB sub pixels appear to be arranged vertically, not horizontally.

Figure 9:
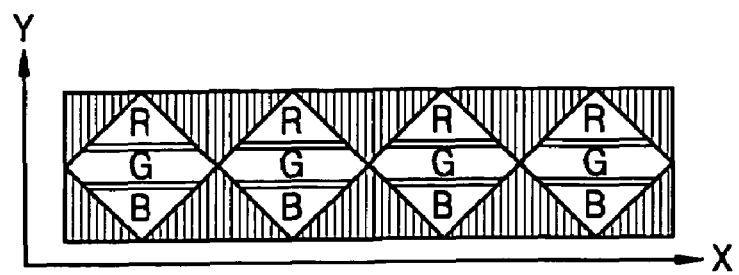
FIG. 9 is a schematic view for explaining the operation of the glassless stereoscopic display of FIG. 3.
Figure 9:
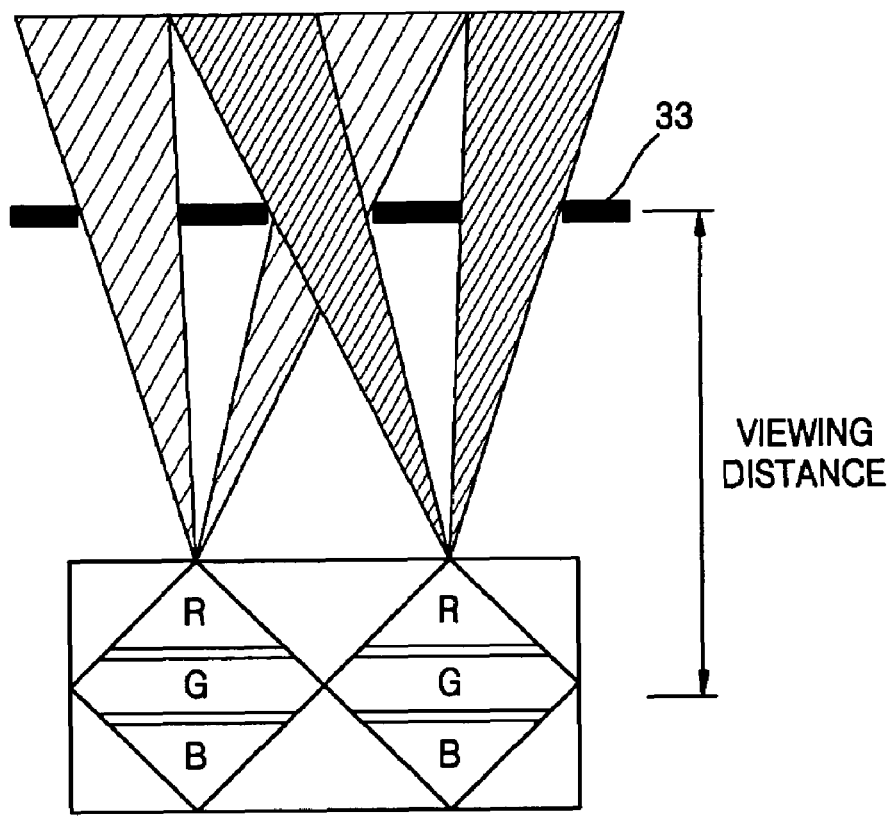
Figure 9:
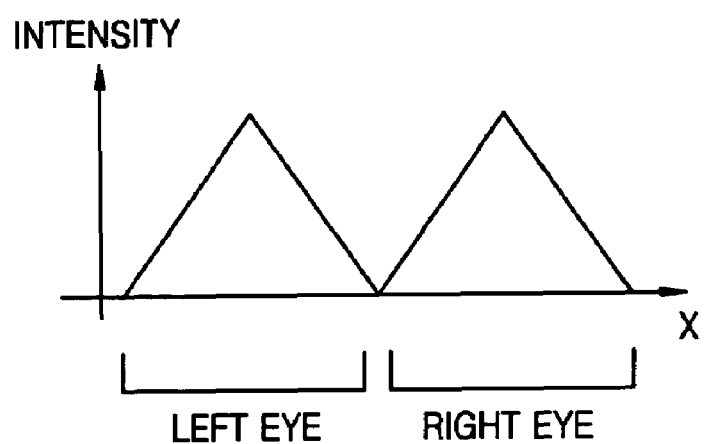

FIG. 9 is a schematic view for explaining the operation of the stereoscopic display of FIG. 3. Referring to FIG. 9, the images rotated by the prism sheet 32 are enlarged and formed by the 3D optical plate 33, such as a lenticular lens sheet or a parallax barrier, in the viewer's left eye and right eye. The RGB colored sub pixels forming the images in the viewer's left eye and right eye appear to be arranged vertically, not horizontally. Accordingly, even if the viewer moves his head horizontally, color separation by which the colors are separated does not occur. As shown in a lower graph of FIG. 9, horizontal light intensity is highest at a central portion of each of a left-eye viewing zone and a right-eye viewing zone, and continuously decreases away from the central portion of each of the viewing zones. Accordingly, even though the viewer moves his head horizontally, he does not see black stripes.

As described above, since the glassless stereoscopic display according to the present invention has the plurality of dove prism elements slanted by approximately 45° with respect to the horizontal surface of the display panel, images displayed by the pixels of the display panel are rotated by approximately 90°. As a result, color separation and black stripes, which are problems in a conventional glassless stereoscopic display, can be avoided. Accordingly, the viewer can see a natural 3D image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stereoscopic display comprising:
   a display panel displaying an image using a plurality of pixels;
   a three-dimensional (3D) optical plate separating the image displayed by the display panel into a left-eye image and a right-eye image; and
   a prism sheet disposed between the display panel and the 3D optical plate and having a plurality of prism elements regularly arranged to rotate an image provided by each of the pixels of the display panel by approximately 90°.

2. The stereoscopic display of claim 1, wherein each of the plurality of prism elements has a first inclined surface on which an image is incident and a second inclined surface through which an image emerges, and an angle of intersection between extensions of the first inclined surface and the second inclined surface is approximately 90°.

3. The stereoscopic display of claim 2, wherein the prism elements are dove prisms.

4. The stereoscopic display of claim 1, wherein the prism elements of the prism sheet are diagonally slanted with respect to the pixels of the display panel.

5. The stereoscopic display of claim 4, wherein the plurality of prism elements are slanted by approximately 45°.

6. The stereoscopic display of claim 4, wherein each of the prism elements of the prism sheet corresponds respectively to a series of pixels which are diagonally connected in the display panel.

7. The stereoscopic display of claim 6, wherein the width of a horizontal section of each of the prism elements is equal to the width of each of the pixels of the display panel.

8. The stereoscopic display of claim 6, further comprising a plurality of black masks regularly formed in each of the prism elements to block images displayed by edge portions of the pixels of the display panel, thereby preventing crosstalk between adjacent pixels.

9. The stereoscopic display of claim 8, wherein regions of the prism elements where the black masks are not formed rotate images displayed by the pixels by 90° such that red, green and blue (RGB) sub pixels which are arranged horizontally appear to be arranged vertically.

10. The stereoscopic display of claim 8, wherein the prism sheet comprises:
   an entrance prism sheet having a plurality of regular inclined surfaces on which images provided by the display panel are incident;
   an exit prism sheet having a plurality of regular inclined surfaces through which the images incident on the entrance prism sheet emerge; and
   a black mask film that is interposed between the entrance prism sheet and the exit prism sheet and includes a plurality of black masks which are regularly formed in a grating pattern to block images displayed by the edge portions of the pixels of the display panel.

11. A stereoscopic display comprising:
   a display panel displaying an image using a plurality of pixels;
   a three-dimensional (3D) optical plate separating the image displayed by the display panel into a left-eye image and a right-eye image; and
   a prism sheet disposed between the display panel and the 3D optical plate, having an optical axis extending therethrough said display panel, said prism sheet and said 3D optical plate and a plurality of prism elements arranged to rotate an image in a plane perpendicular to the optical axis, provided by each of the pixels of the display panel.

12. The stereoscopic display of claim 11, wherein the plurality of prism elements are dove prisms having a first inclined surface on which an image is incident and a second inclined surface through which a rotated image emerge.

13. The stereoscopic display of claim 12, wherein the prism elements of the prism sheet are diagonally slanted with respect to the pixels of the display panel so that each of the prism elements of the prism sheet can correspond respectively to a series of pixels which are diagonally connected in the display panel.

14. The stereoscopic display of claim 11, wherein the prism elements of the prism sheet are diagonally slanted with respect to the pixels of the display panel so that each of the prism elements of the prism sheet can correspond respectively to a series of pixels which are diagonally connected in the display panel.

15. The stereoscopic display of claim 14, further comprising a plurality of black masks regularly formed in each of the prism elements to block images displayed by edge portions of the pixels of the display panel, thereby preventing crosstalk between adjacent pixels.

* * * * *